United States Patent [19]

Heynisch et al.

[11] 4,292,566

[45] Sep. 29, 1981

[54] TRAVELING WAVE TUBE WITH A HELICAL DELAY LINE

[75] Inventors: Hinrich Heynisch, Graefelfing; Erwin Huebner; Heinz Barth, both of Munich, all of Fed. Rep. of Germany

[73] Assignee: Siemens Aktiengesellschaft, Berlin & Munich, Fed. Rep. of Germany

[21] Appl. No.: 65,733

[22] Filed: Aug. 10, 1979

[30] Foreign Application Priority Data

Sep. 19, 1978 [DE] Fed. Rep. of Germany ....... 2840782

[51] Int. Cl.[3] ............................................ H01J 25/34

[52] U.S. Cl. .................................. 315/3.5; 29/25.11; 29/25.15

[58] Field of Search ........................ 315/3.5, 3.6, 39.3, 315/; 29/25.11, 25.15

[56] References Cited

U.S. PATENT DOCUMENTS

| | | | |
|---|---|---|---|
| 3,242,375 | 3/1966 | Anderson et al. | 315/3.5 |
| 3,300,677 | 1/1967 | Karol et al. | 315/3.5 |
| 3,475,643 | 10/1969 | Schrager et al. | 315/3.5 |
| 3,634,723 | 1/1972 | Gross | 315/3.5 |
| 3,670,196 | 6/1972 | Smith | 315/3.5 |
| 3,895,326 | 7/1975 | Hinckeldey et al. | 333/162 |
| 3,949,263 | 4/1976 | Harper | 315/3.5 |

*Primary Examiner*—Saxfield Chatmon, Jr.
*Attorney, Agent, or Firm*—Hill, Van Santen, Steadman, Chiara & Simpson

[57] ABSTRACT

A traveling wave tube having a helical delay line has a plurality of dielectric holding rods for supporting the delay line relative to a vacuum envelope. The holding rods are firmly adhered to the delay line and the envelope by means of solid-state reactions.

3 Claims, 1 Drawing Figure

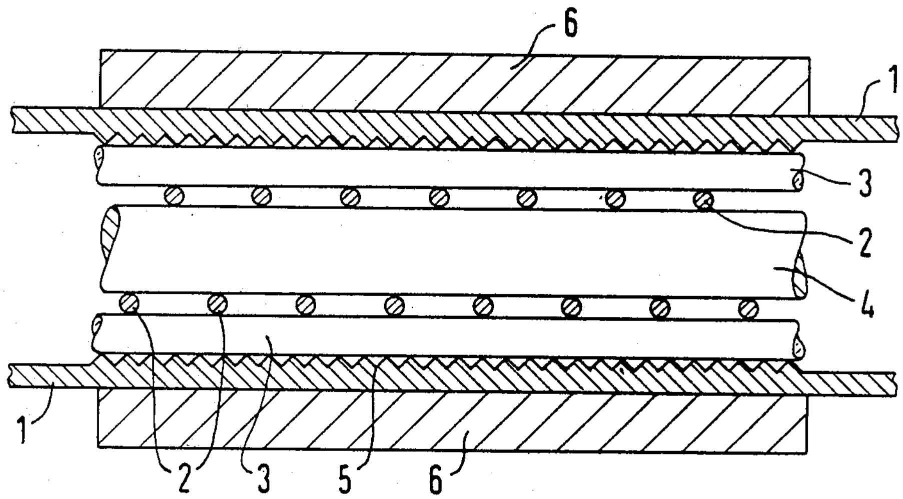
6
1
3
2
4
1
2
3
5
6

TRAVELING WAVE TUBE WITH A HELICAL DELAY LINE

FIELD OF THE INVENTION

The present invention relates to a traveling wave tube with a helical delay line, and more particularly to such a tube in which the delay line is supported by dielectric holding rods in good thermal contact with the vacuum envelope.

THE PRIOR ART

Traveling wave tubes are known for example in the Gross et al U.S. Pat. No. 3,734,723, which employ a helical delay line supported within a vacuum envelope by a plurality of dielectric holding rods. The rods are arranged parallel to each other along the length of the delay line, and are typically fixed in position by means of a shaped interior cross section of the vacuum envelope. The holding rods are in good thermal contact with the vacuum envelope in order to provide heat dissipation, and to provide a secure and elastic mounting for the delay line.

In the past, the problem of how to maximize the heat conductivity between the delay line and the vacuum envelope was solved by means of various clamping techniques, or by stamping or shrinking. Accordingly, most of the component parts of the tube, particularly the delay line and the vacuum envelope, were required to be formed of elastic metals with heat dissipation and electrical conductivity which was not ideal.

It is also known to manufacture the vacuum envelope and the delay line of copper, and to solder these parts with holding rods of dielectric material.

SUMMARY OF THE INVENTION

A principal object of the present invention is to minimize the thermal resistance and high frequency losses incurred in a traveling wave tube employing a helical delay line.

The object is achieved in the present invention by forming the vacuum envelope and the delay line of copper, and connecting these parts with the holding rods by means of solid-state reactions taking place between the materials forming the delay line, the holding rods, and the envelope. The reactions involving mixed crystal formation taking place with copper or copper oxide. The holding rods are preferably formed of berrylium oxide or aluminum oxide.

The present invention achieves the significant advantage that the best possible heat dissipation is realized, simultaneously with the lowest possible high frequency losses, thereby producing a maximum electronic efficiency. The present invention allows the use of ductile copper for the helix as well as for the vacuum envelope, and allows the use of holding rods formed of berrylium oxide.

Berrylium oxide has a high thermal conductivity, and by means of the solid-state reactions between copper and copper oxide via mixed crystal formation or between copper oxide and berrylium oxide by means of mixed crystal formation, the smallest possible thermal resistance is obtained. Since the present invention allows the use of copper for the delay line and for the envelope, good thermal and electric conductivity is achieved, giving the smallest possible high frequency losses and accordingly the smallest heat dissipation.

Thus, improved electronic efficiency and greater bandwidths are obtainable.

In accordance with the present invention, the traveling wave tube, with its delay line, can be manufactured in a single processing step, without any pre-treatment except for cleaning of the individual component parts.

These and other objects and advantages of the present invention will become apparent by an inspection of the following description and the accompanying drawing.

BRIEF DESCRIPTION OF THE DRAWING

The single FIGURE of the drawing illustrates a longitudinal cross section of a portion of a traveling wave tube having a helical delay line.

DESCRIPTION OF THE PREFERRED EMBODIMENTS

The traveling wave tube incorporates a helical delay line 2 formed of copper and supported within a vacuum envelope 1, which is also formed of copper. The delay line 2 is formed of copper wire or a copper band, and is wound about an interior mandrel 4. The mandrel 4 has a polished surface and is formed of material having a greater coefficient of expansion than copper, for example, V2a-steel.

The holding rods 3 are preferably formed of berrylium oxide, and at least two, and preferably three or more rods are provided, interposed between the delay line 2 and the envelope 1. Before assembly, the holding rods 3 are cleaned, and if desired, they can be provided with a surface layer of carbon which serves as an attenuation layer.

The inner surface of the vacuum envelope 1 is provided with a number of very fine thread-like or annular grooves 5, in order to better absorb axial thermal expansion of the holding rods 3 after the process of the present invention is completed. The vacuum envelope 1 may be formed as an extruded part.

When the parts are assembled as illustrated in the drawing, a cylindrical tube 6 is slipped onto the outside of the vacuum envelope 1. The tube 6 is formed of molybdenum, which has a lower coefficient of expansion than copper, so that when the parts are heated, a pressure is directed inwardly on the vacuum envelope 1. Simultaneously, the mandrel 4 expands, resulting in a mutually well-seated physical positioning of the parts relative to each other as the temperature is increased. The assembly is heated briefly to a temperature between 400° C. and 700° C. to seat the parts. The assembly is then subjected to a temperature of approximately 150° C. in normal dry air for a duration of approximately 90 minutes. A layer of copper oxides ($CuO$, $CuO_2$) form on the copper surfaces.

After 90 minutes, the ambient atmosphere is changed to dry nitrogen, and the temperature is increased to approximately 600° C. and kept there for approximately 10 minutes. During this period, solid-state reactions take place giving a mixed crystal formation and firmly adhering connections between the copper envelope 1 and the berrylium oxide holding rods 3.

Subsequently, the atmosphere is changed to cracked gas (or $H_2$) in order to reduce the copper surfaces to pure copper and the temperature is maintained at about 600° C. for 15 minutes. Then the apparatus is cooled and when the temperature falls below 50° C., the mandrel 4 and the tube 6 can be removed, leaving the other parts in firmly assembled relationship.

Various additions and modifications may be made in the apparatus and method of the present invention by those skilled in the art without departing from the essential features of novelty thereof, which are intended to be defined and secured by the appended claims.

What is claimed is:

1. A method for the manufacture of a traveling wave tube comprising the steps of placing a copper delay line onto an inner mandrel formed of a material having a greater coefficient of expansion than copper, assembling said delay line and a plurality of dielectric holding rods with a vacuum envelope, inserting the assembly into a tube formed of a material with a lower coefficient of expansion than copper; bringing the assembly to a temperature between 400° C. and 700° C.; exposing the assembly to a temperature of approximately 150° C. in dry air for approximately 90 minutes; exposing the assembly to a temperature of approximately 600° C. in dry nitrogen for approximately 10 minutes; and exposing the assembly to a temperature of approximately 600° C. in cracked gas or $H_2$ for approximately 15 minutes.

2. A method for the manufacture of a traveling wave tube comprising the steps of placing a copper delay line onto an inner mandrel formed of a material having a greater coefficient of expansion than copper, assembling said delay line with a plurality of dielectric holding rods and a vacuum envelope, inserting the assembly into a tube formed of a material with a lower coefficient of expansion than copper, and heating said assembly, whereby said dielectric holding rods become fixed to said vacuum envelope and to said delay line by a solid state reaction involving the formation of mixed crystals.

3. The method according to claim 2, wherein said dielectric holding rods are formed of berrylium oxide or aluminum oxide.

* * * * *